US006832710B2

(12) United States Patent
Galbraith et al.

(10) Patent No.: US 6,832,710 B2
(45) Date of Patent: Dec. 21, 2004

(54) MOTORCYCLE SADDLEBAG

(75) Inventors: Stephen L. Galbraith, Cedarburg, WI (US); Thomas R. Wargin, Menomonee Falls, WI (US); P. Kirk Rasmussen, Wales, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 107 days.

(21) Appl. No.: 09/903,426

(22) Filed: Jul. 11, 2001

(65) Prior Publication Data

US 2003/0010798 A1 Jan. 16, 2003

(51) Int. Cl.[7] ................................. B62J 9/00
(52) U.S. Cl. .................... 224/413; 16/366; 16/370; 220/817; 220/818; 224/428; 224/433
(58) Field of Search ............... 224/413, 428, 224/429, 435, 433; 220/830, 413, 827, 230, 263, 817, 218, 811, 273, 818, 813; 16/239, 241, 244, 246, 252, 267, 270, 272, 365, 366, 369, 370

(56) References Cited

U.S. PATENT DOCUMENTS

| 246,503 A | * | 8/1881 | Haslett ........................ 224/413 |
| 1,009,108 A | * | 12/1911 | Soss |
| 1,997,043 A | * | 4/1935 | Clark ........................ 206/246 |
| 2,527,433 A | * | 10/1950 | LaRochelle ................. 244/413 |
| 2,882,004 A | * | 4/1959 | Leishman ................. 248/284.1 |
| 3,233,820 A | * | 2/1966 | Williams .................... 229/125 |
| 3,355,088 A | * | 11/1967 | Young .................... 229/125.11 |
| 4,099,647 A | * | 7/1978 | Bergh et al. ................. 220/845 |
| 4,587,760 A | * | 5/1986 | Brissette ...................... 49/252 |
| 4,853,985 A | * | 8/1989 | Perry ............................ 4/498 |
| 4,928,350 A | * | 5/1990 | Morgan ........................ 16/297 |
| 5,207,490 A | * | 5/1993 | Kaspar et al. ......... 16/DIG. 17 |
| 5,339,494 A | * | 8/1994 | Esau et al. .................... 16/294 |
| 5,441,167 A | * | 8/1995 | Shigeru ....................... 220/830 |
| 5,471,709 A | * | 12/1995 | Lanzani ....................... 16/238 |
| 5,943,739 A | * | 8/1999 | Vandergriff .................. 16/221 |
| 5,967,392 A | * | 10/1999 | Niemi et al. .................. 16/289 |
| 6,223,960 B1 | * | 5/2001 | Powell et al. ............... 190/125 |
| 6,257,436 B1 | * | 7/2001 | McGlauflin ................. 220/533 |
| 6,338,260 B1 | * | 1/2002 | Cousins et al. ............. 190/120 |

OTHER PUBLICATIONS

Sportster Hard Saddlebags, Harley–Davidson 2001 Genuine Motor Accessories and Genuine Motor Parts Catalog, Jun. '00, p. 118.

Dyna Hard Saddlebags, Harley–Davidson 2001 Genuine Motor Accessories and Genuine Motor Parts Catalog, Jun. '00, p. 188.

(List continued on next page.)

Primary Examiner—Lee Young
Assistant Examiner—Maerena Brevard
(74) Attorney, Agent, or Firm—Michael Best & Friedrich LLP

(57) ABSTRACT

A saddlebag includes a body and a lid pivotally attached to the body by a hinge assembly. The lid moves in a substantially translational manner to disengage and engage the body, and moves in a pivotal manner when not engaging the body. The saddlebag also includes a locking assembly selectively securing the lid in a closed position and being operable via a push-button located on an outer surface of the saddlebag body. A gas spring is interconnected between the body and the lid of the saddlebag, biasing the lid toward the open position such that depressing the push button releases the lid, allowing the gas spring to expand and fully open the saddlebag with no further intervention by the operator.

13 Claims, 6 Drawing Sheets

OTHER PUBLICATIONS

Heritage Softail Classic Hard Saddlebags, Harley–Davidson '01 Gen. Motor Access. & Gen. Motor Parts Catlg, Jun. '00, p. 292.

Softail Hard Saddlebags, Harley–Davidson 2001 Genuine Motor Accessories and Genuine Motor Parts Catalog, Jun. '00, p. 292.

Softail Deuce Hard Saddlebags, Harley–Davidson '01 Genuine Motor Access. & Genuine Motor Parts Catalog, Jun. '00, p. 293.

Saddlebag Liners for Softail Hard Saddlebags, Harley–Davidson '01 Gen. Motor Access. & Gen. Motor Parts Catalog, Jun. '00, p. 294.

* cited by examiner

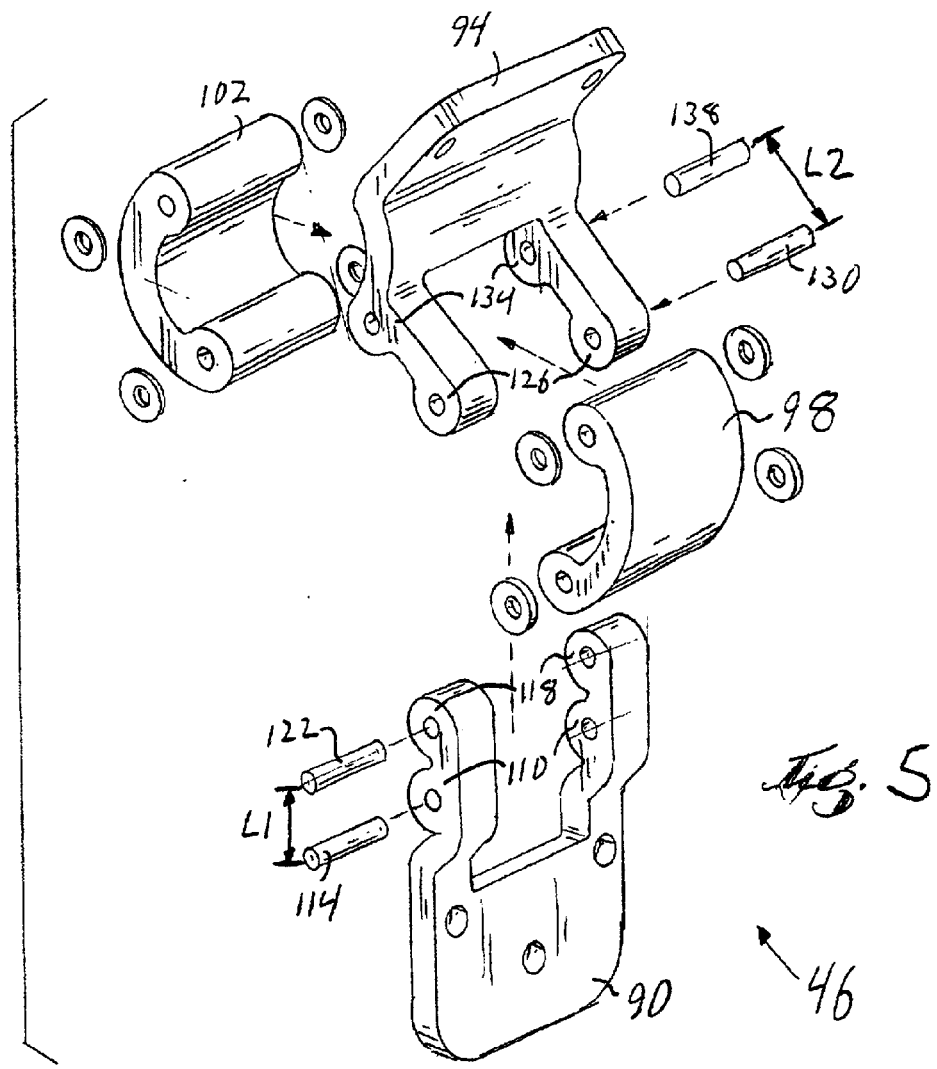
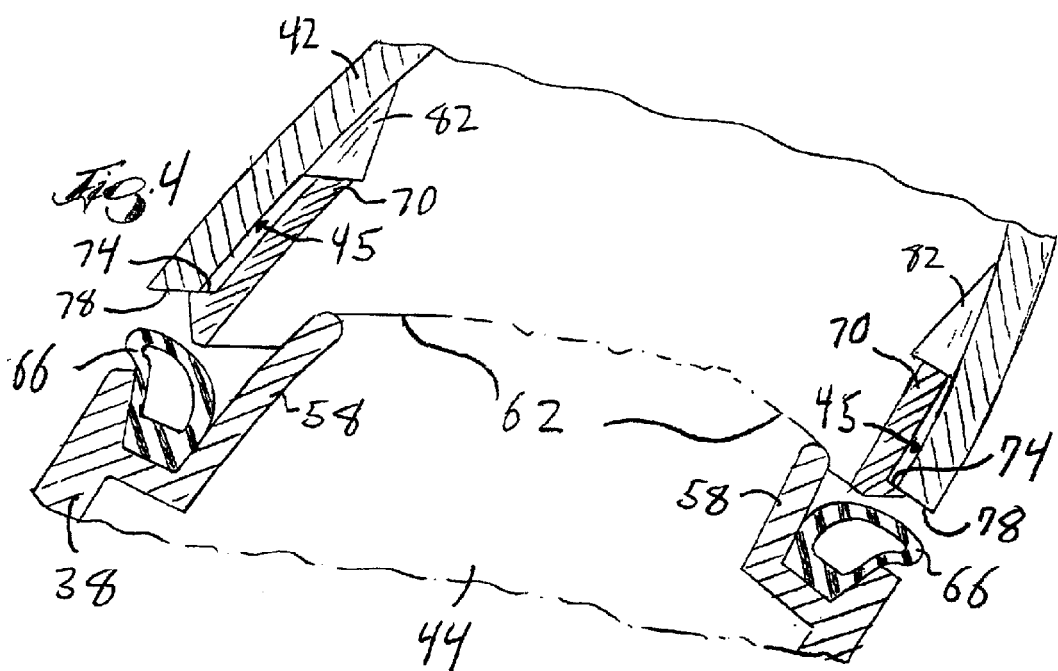

MOTORCYCLE SADDLEBAG

BACKGROUND

The invention relates to motorcycle saddlebags.

SUMMARY

The present invention provides a motorcycle saddlebag. The saddlebag includes a body, a lid, and a hinge assembly interconnecting the body and the lid. The body has an inner surface defining a cavity. The lid has an inner surface and is movable between an open position and a closed position. When in the open position, the lid does not fully cover the cavity, but when in the closed position, the inner surface of the lid defines an upper boundary of the cavity, and the lid fully covers the cavity. The hinge assembly includes a first mounting member mounted to the inner surface of the body, a second mounting member mounted to the inner surface of the lid, and a coupling assembly pivotally coupling the first and second mounting members to each other. The hinge assembly is completely enclosed within the cavity when the lid is in the closed position.

The hinge assembly may further include first and second coupling members pivotally coupled between the first and second mounting members by way of pins. The first and second coupling members are preferably substantially identical to each other. Preferably there are four pins establishing a four bar linkage within the hinge assembly. Due to the four bar linkage configuration, the lid moves in a substantially vertical translational fashion at least until the lid substantially entirely disengages the body, and then moves in a substantially pivotal fashion with respect to the body.

At least one of the lid and body may have a chrome plating adhered to its external surface and at least one of the lid and body is preferably constructed of an ABS/polycarbonate blend.

Preferably, a body lip is integrally injection-molded with the body and defines a mouth of the cavity. A gasket may be positioned on the body lip and a lid lip may be mounted to the lid. The gasket is sandwiched between the lid lip and the body lip when the lid is closed. The lid lip is preferably manufactured separately from the rest of the lid and is preferably glued to the lid. The lid lip preferably includes an undercut that rests on the edge of the lid, and the lid preferably has internal gussets to give additional support to the lid lip.

A gas spring may be employed to bias the lid toward the open position. A locking mechanism may also be used to lock the lid in the closed position.

Other features and advantages of the invention will become apparent to those skilled in the art upon review of the following detailed description, claims, and drawings.

BRIEF DESCRIPTION OF THE DRAWINGS

FIG. 4 is a section view taken along line 4—4 in FIG. 3 showing the saddlebag in a slightly opened position.

FIG. 5 is an enlarged exploded perspective view of the hinge assembly of the saddlebag.

Figure 1:
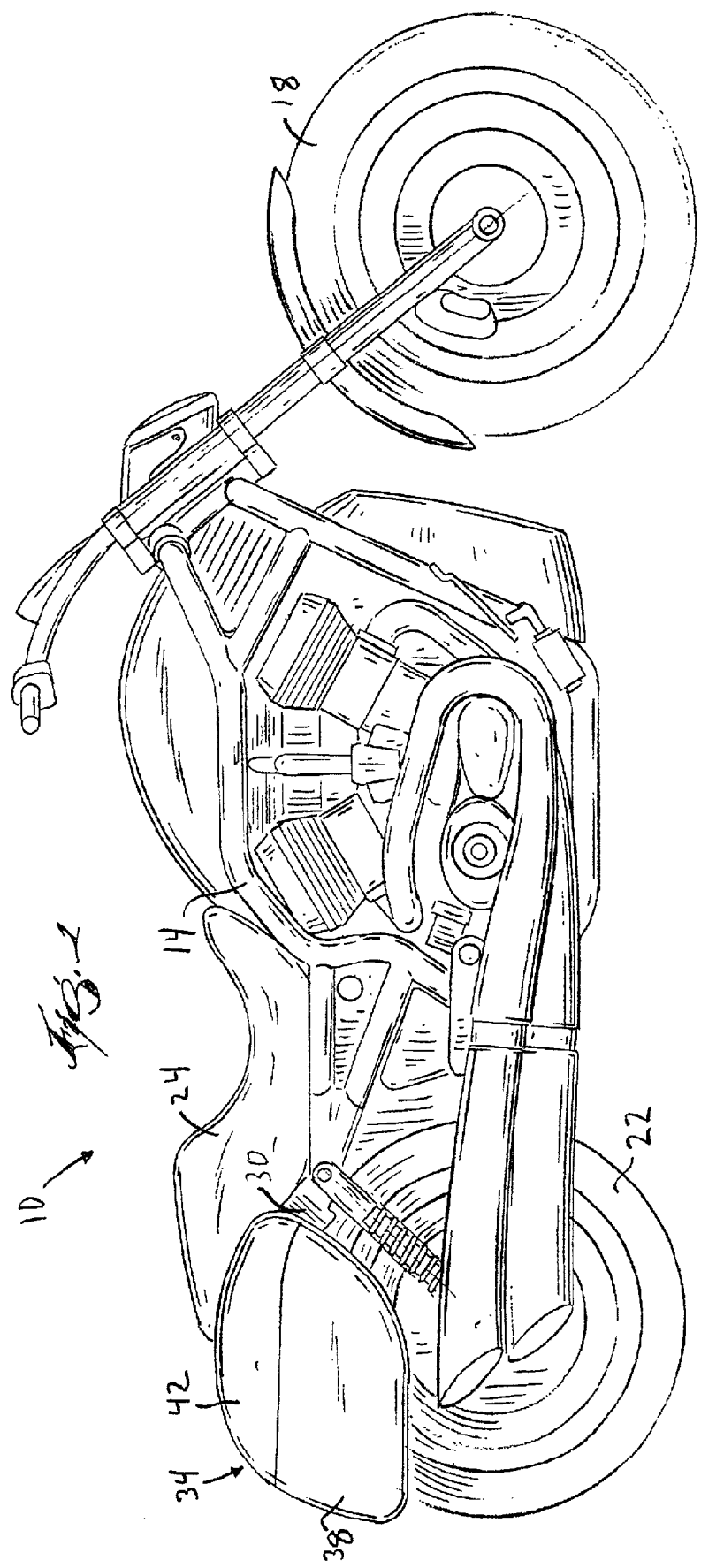
FIG. 1 is a side view of a motorcycle with a saddlebag embodying the current invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a motorcycle 10 including a frame 14, a front wheel 18, a rear wheel 22 and a seat 24. A rear fender 30 extends rearwardly of the seat 24 and is disposed substantially over the rear wheel 22. A saddlebag 34 is removably mounted aside the rear fender 30. The saddlebag 34 includes a body 38, and a lid 42 pivotally coupled to the body 38. The body 38 and/or the lid 42 are preferably injection-molded from an ABS/polycarbonate blend and one or both of the lid 42 and body 38 is preferably chrome plated; however, any suitable materials, fabrication methods, and finishes may be used in constructing the saddlebag 34.

Figure 2:
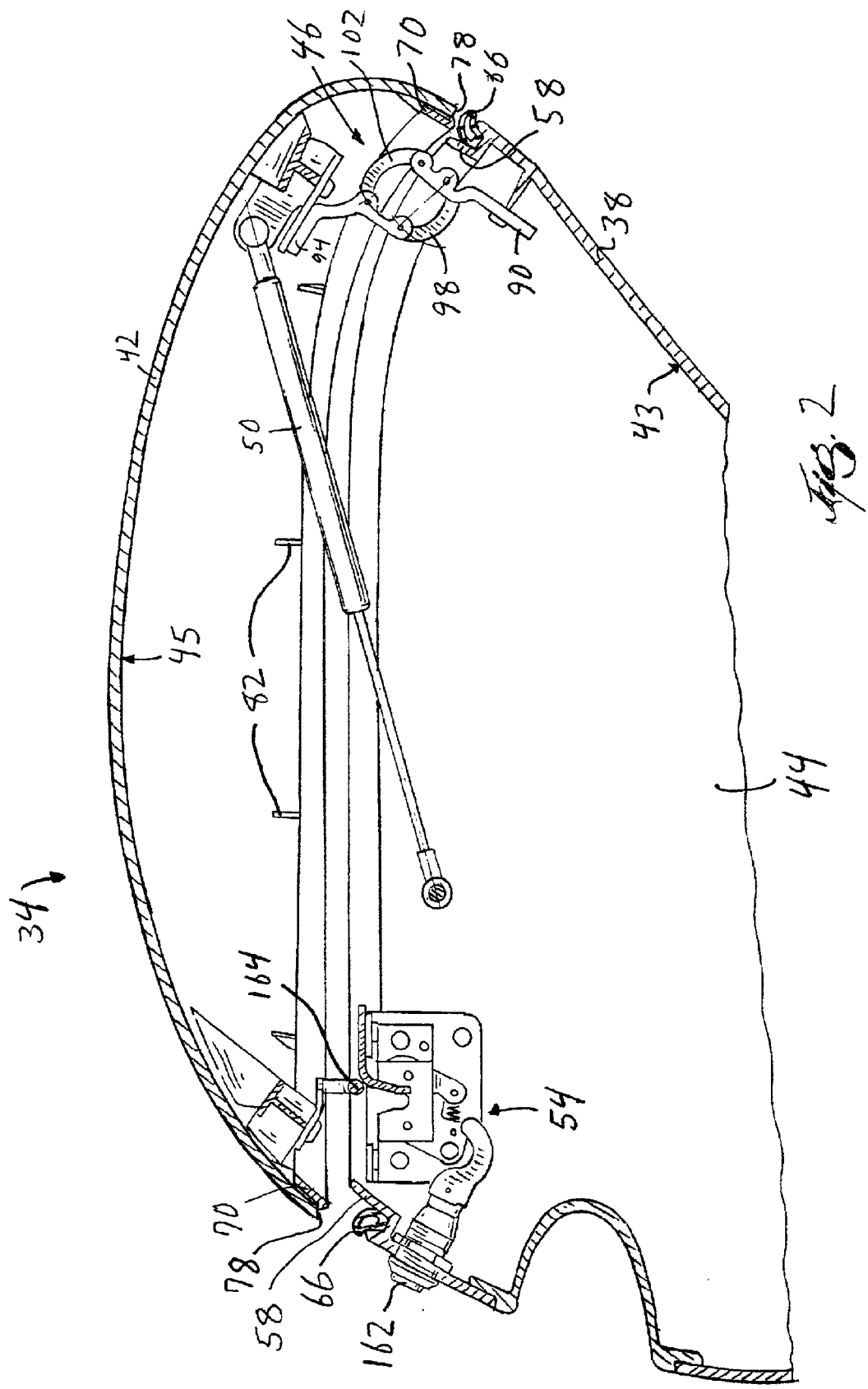
FIG. 2 is a section view of the saddlebag illustrated in FIG. 1.
Figure 3:
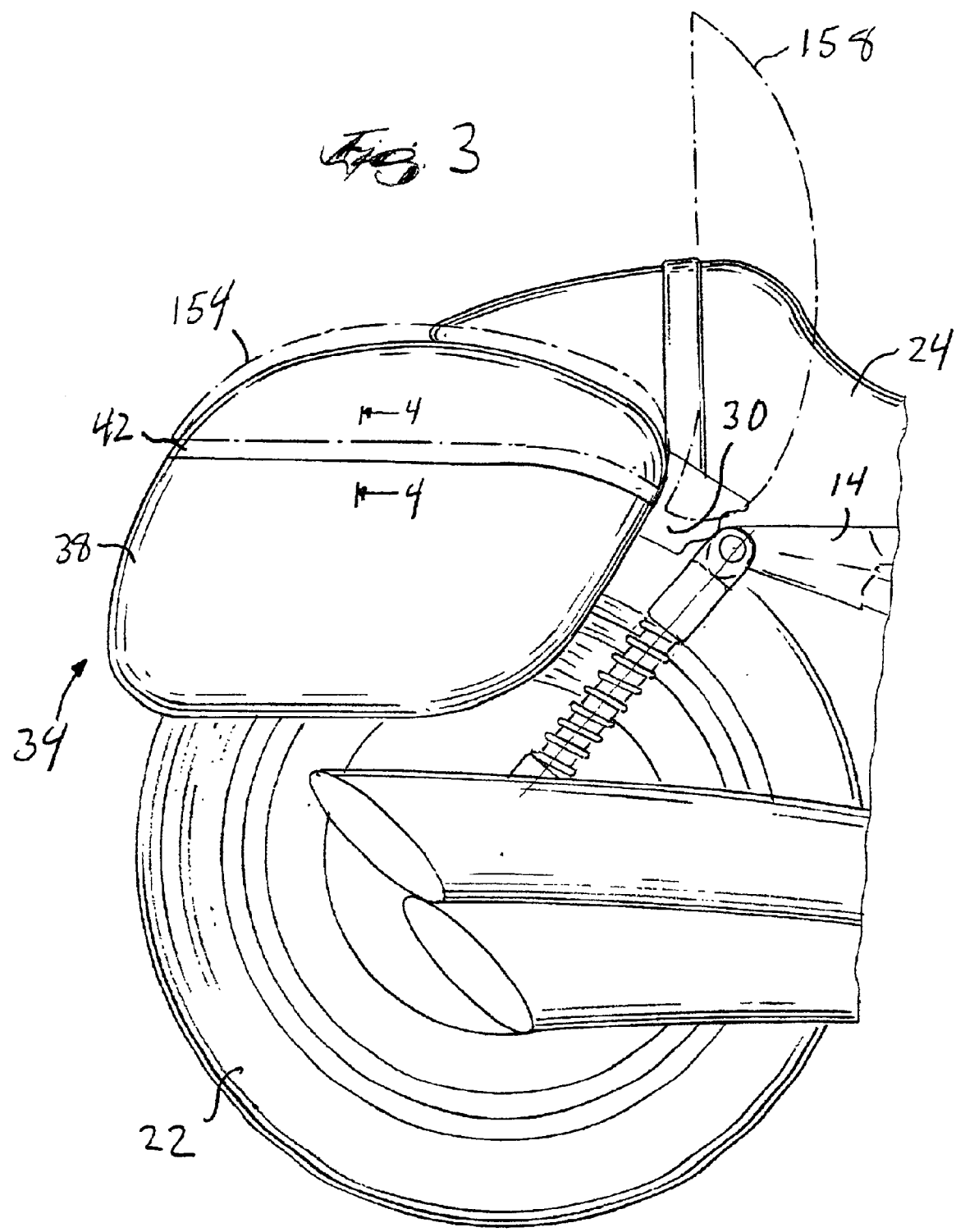
FIG. 3 is an enlarged view of the rear portion of the motorcycle illustrated in FIG. 1.

Referring now to FIGS. 2 and 3, the body 38 includes an inner surface 43 defining an upward-opening cavity 44. The lid 42 includes an inner surface 45 and is movable between a closed position (shown in solid lines in FIG. 3), and an open position (shown in phantom in FIG. 3). When the lid 42 is in the closed position, the inner surface 45 fully closes the cavity 44 and defines an upper boundary thereof. When the lid 42 is moved to the open position, the inner surface 45 separates from the inner surface 43, opening the cavity 44 and allowing items to be easily inserted into or withdrawn from the saddlebag 34. The saddlebag 34 also includes a hinge assembly 46, a gas spring 50 interconnected between the lid 42 and the body 38, and a locking mechanism 54 selectively interconnecting the lid 42 to the body 38 as will be discussed in more detail below.

Referring now to FIG. 4, the body 38 includes an integrally formed body lip 58. The body lip 58 defines a mouth 62 of the cavity 44 and supports a gasket 66. The lid 42 includes a lid lip 70 having an undercut 74. The undercut 74 is positioned on an edge 78 of the lid 42. The lid 42 also includes gussets 82 further supporting the lid lip 70 to reduce shear stresses on the lid lip 70. The lid lip 70 is preferably glued to the inner surface 45 of the lid 42. When closed (FIGS. 3 and 6), the lid lip 70 engages the gasket 66 along a joining perimeter around the entire mouth 62 of the cavity 44.

Referring now to FIG. 5, the hinge assembly 46 includes a first mounting member 90 mounted to the body 38, a second mounting member 94 mounted to the lid 42, a first coupling member 98, and a second coupling member 102. The first coupling member 98 and the second coupling member 102 are substantially identical to each other and are both pivotally coupled to both mounting members 90, 94. In this regard, the coupling members 98, 102 form a coupling assembly 106.

The first mounting member 90 includes a first pair of mounting bosses 110 supporting a first pin 114, and a second pair of mounting bosses 118 supporting a second pin 122. The first and second pins 114, 122 are substantially parallel to each other and are spaced apart a first distance L1. The second mounting member 94 includes a third pair of mounting bosses 126 supporting a third pin 130 and a fourth pair of mounting bosses 134 supporting a fourth pin 138. The third and fourth pins 130, 138 are substantially parallel to each other as well as to the first and second pins 114, 122. The third and fourth pins 130, 138 are spaced apart a second distance L2 different from the first distance L1. The second distance L2 is preferably larger then the first distance L1. The first coupling member 98 is pivotally coupled to both the first and third pins 114, 130, and the second coupling member 102 is pivotally coupled to both the second and fourth pins 122, 138. The hinge assembly 46 is therefore a four-bar linkage between the body 38 and the lid 42.

Figure 6:
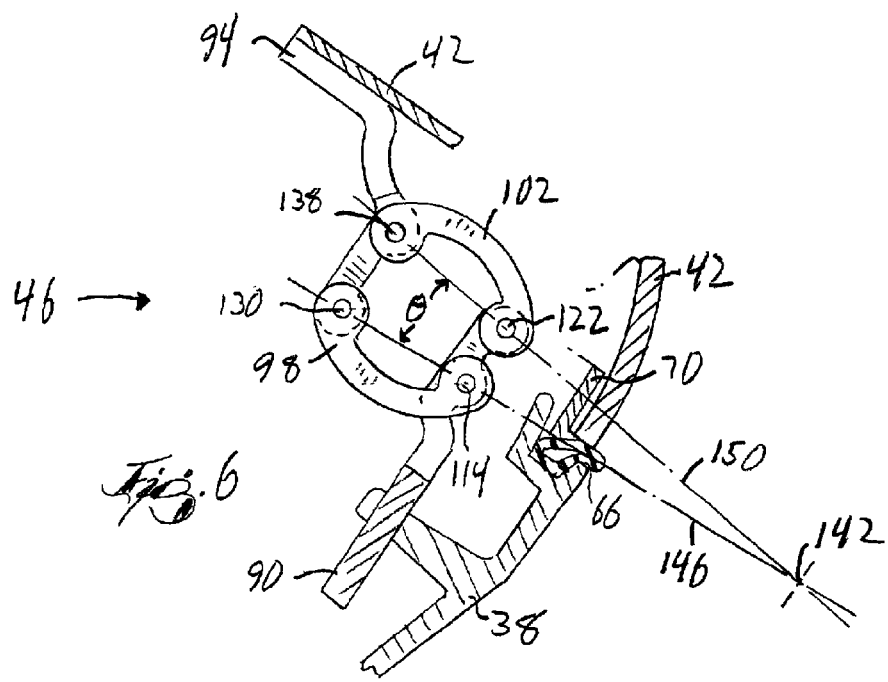
FIG. 6 is an enlarged section view of the saddlebag hinge in the fully closed position.
Figures 7, 8:
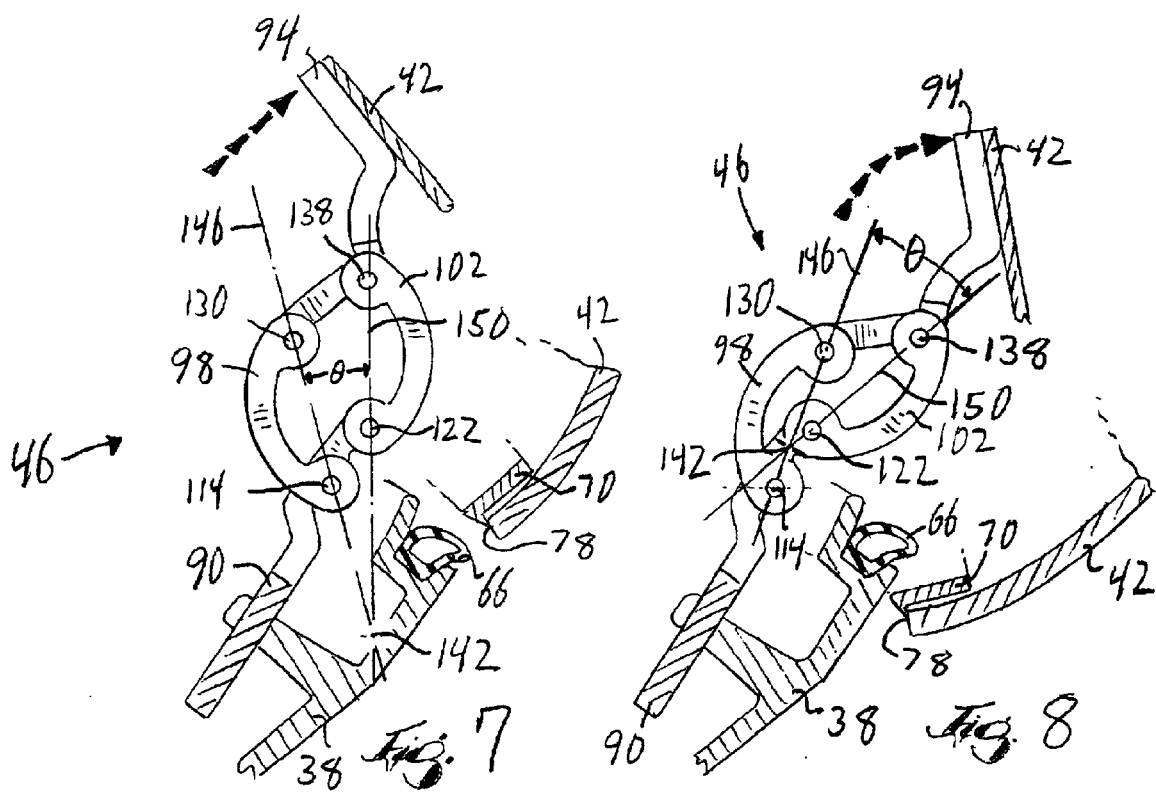
FIG. 7 is an enlarged section view of the saddlebag hinge in a partially opened position.
FIG. 8 is an enlarged section view of the saddlebag hinge in a fully opened position.

Referring now to FIGS. 6–8, the hinge assembly 46 is characterized by an instantaneous pivot axis 142 about which the lid 42 pivots. The pivot axis 142 is located by defining a first plane 146 extending through the longitudinal axes of the first and third pins 114, 130, and a second plane 150 extending through the longitudinal axes of the second and fourth pins 122, 138. The intersection of the first and second planes 146, 150 defines the pivot axis 142 of the saddlebag lid 42. The planes 146, 150 diverge from each other an angle θ. The angle θ represents the effective angle between the first coupling member 98 and the second coupling member 102.

When the lid 42 fully is closed (FIG. 6), the pivot axis 142 is a maximum distance from the hinge assembly 46 and the angle θ has a minimum value. As the lid 42 begins to open (e.g. position 154 in FIG. 3 and that illustrated in FIG. 7), the angle θ increases and the pivot axis 142 moves closer to the hinge assembly 46. Because of the large distance between the pivot axis 142 and the hinge assembly 46 when the lid 42 first begins to open, the lid 42 disengages the body 38 in a substantially vertical translational motion (see arrow in FIG. 7). As the lid 42 continues to open, the angle θ continues to increase and the distance between the pivot axis 142 and the hinge assembly 46 continues to decrease resulting in a transition from substantially translational motion to substantially rotational motion (see arrow in FIG. 8) of the lid 42 with respect to the body 38. When the lid 42 is in the fully open position (e.g. position 158 in FIG. 3 and that shown in FIG. 8), the angle θ has a maximum value and the distance between the pivot axis 142 and the hinge assembly 46 has a minimum value. Closing the lid 42 results in a similar transition from substantially rotational motion to substantially translational motion such that when the lid 42 once again engages the body 38, it does so in a substantially vertical translational motion.

Due to the configuration of the hinge assembly 46, as the lid 42 is closed and opened, substantially the entire lid lip 70 respectively engages and disengages substantially the entire gasket 66 instantaneously along the joining perimeter of the saddlebag 34. As a result, there is substantially no localized pinching of the gasket 66 by the lid lip 70 and wear on the lid lip 70 and gasket 66 is significantly reduced.

Figure 9:
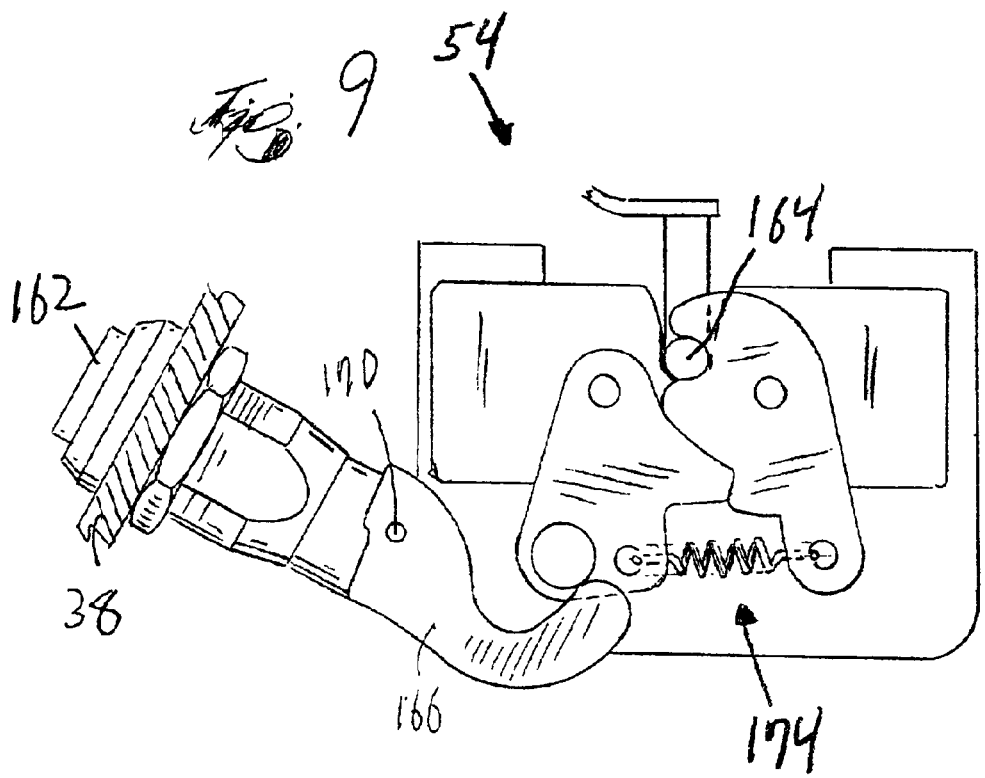
FIG. 9 is an enlarged view of the saddlebag latching mechanism in a closed position.
Figure 10:
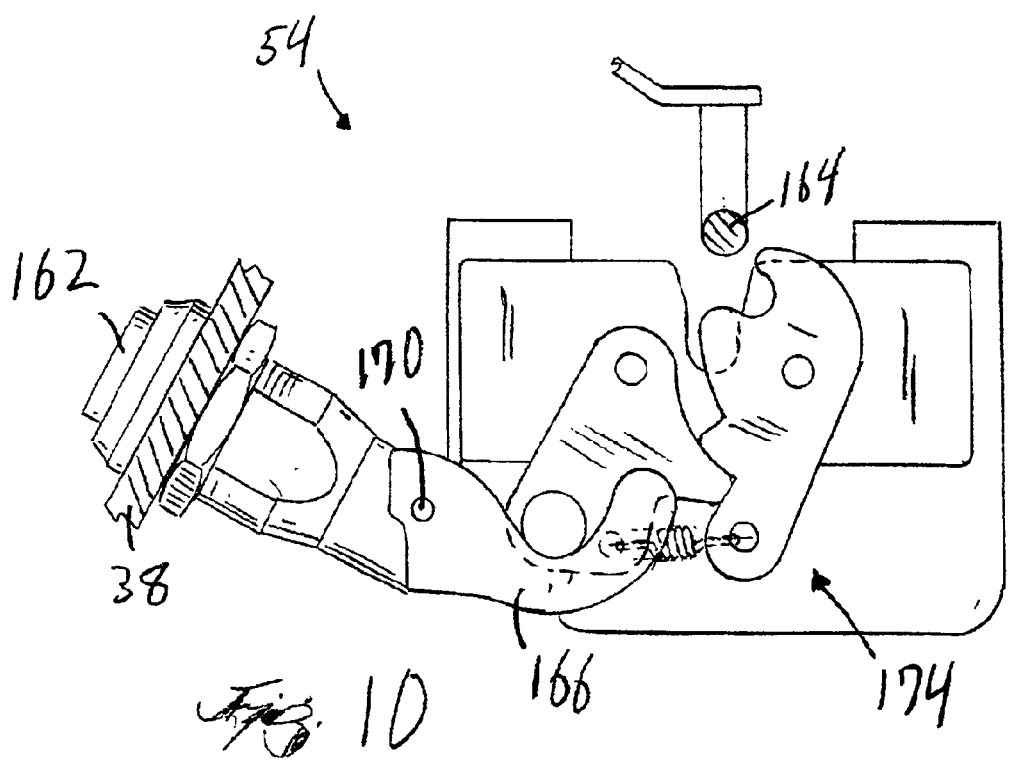
FIG. 10 is an enlarged view of the saddlebag latching mechanism in an opened position.

Referring now to FIGS. 9 and 10, the locking assembly 54 of the saddlebag 34 selectively secures the lid 42 in the closed position, and is operated by a lockable push button 162. The push button 162 is slidably coupled to, and has a portion located outside of, the body 38. The locking assembly 54 also includes a latch 164 mounted to the lid 42. A hook 166 is pivotally coupled to the push button 162 by a pin 170, and a cam mechanism 174 is pivotally coupled to the saddlebag body 38. When the lid 42 is closed the locking assembly 54 is in a first position (FIG. 9) wherein the cam mechanism 174 engages the latch 164. Depressing the push button 162 causes the hook 166 to pivot about the pin 170 and engage the cam mechanism 174, moving the cam mechanism 174 to a second position (FIG. 10) and releasing the latch 164 such that the lid 42 may be moved toward the open position. The cam mechanism 174 then remains in the second position to receive the latch 164 when the lid 42 is closed. When the lid 42 is moved to the fully closed position the latch 164 engages the cam mechanism 174, returning it to the first position and securing the saddlebag lid 42 in the closed position. The push button 162 may be locked against actuation with a key (not shown) to lock the lid 42 in the closed position.

Returning to FIG. 2, the gas spring 50 biases the lid 42 toward the open position (see 158 in FIG. 3). When the lid 42 is closed, the hinge assembly 46, the gas spring 50, and the locking assembly 54 (except for the push button 162) are contained within the cavity 44 and are completely hidden from view. The saddlebag 34 may be opened by unlocking the push button 162 with the key (if necessary) and simply depressing the push button 162 to release the latch 164. The lid 42 is then moved toward the fully open position under the influence of the gas spring 50 alone.

What is claimed is:

1. A motorcycle saddlebag comprising:

a body having an inner surface defining a cavity;

a lid having an inner surface and movable between an open position in which said lid does not fully cover said cavity and a closed position in which said inner surface of said lid defines an upper boundary of said cavity and in which said lid fully covers said cavity; and a hinge assembly interconnecting said body to said lid, said hinge assembly completely enclosed within said cavity when said lid is in said closed position and including a first mounting member mounted to said inner surface of said body, a second mounting member mounted to said inner surface of said lid, and a coupling assembly pivotally coupling said first and second mounting members to each other, wherein said lid and body engage each other in a joining perimeter, and wherein said coupling assembly guides said lid through substantially vertical translatory motion at least until said lid substantially entirely disengages said body, and then pivots said lid about a substantially horizontal axis of rotation, wherein said first mounting member includes a first pair of mounting bosses and a first pin supported by said first pair of mounting bosses, wherein said first mounting member also includes a second air of mounting bosses and a second pin supported by said second pair of mounting bosses, wherein said first and second pins are substantially parallel and non-collinear with respect to each other, and wherein said second mounting member is interconnected with and pivotal about both of said first and second pins.

2. The saddlebag of claim 1, wherein said coupling assembly includes first and second coupling members, said first coupling member being pivotally coupled between said first pin and said second mounting member, and said second coupling member being pivotally coupled between said second pin and said second mounting member.

3. The saddlebag of claim 2, wherein said first and second coupling members are substantially identical to each other.

4. The saddlebag of claim 2, wherein said second mounting member includes third and fourth pairs of mounting bosses, and third and fourth pins supported by said third and fourth pairs of mounting bosses, respectively, said third and fourth pins being substantially parallel and non-collinear with respect to each other as well as with respect to said first and second pins, wherein said first coupling member is pivotally coupled between said first pin and said third pin, and said second coupling member is pivotally coupled between said second pin and said fourth pin.

5. The saddlebag of claim 4, wherein said first and second pins are spaced from each other a first distance and wherein said third and fourth pins are spaced from each other a second distance different from said first distance.

6. The saddlebag of claim 1, wherein said lid and body each include a lip, said lips of said lid and body engaging each other in a joining perimeter when said lid is in said closed position, and wherein said coupling assembly includes a means for first lifting said lid lip substantially entirely off of said body lip and then pivoting said lid with respect to said body as said lid is moved toward said open position.

7. The saddlebag of claim 1, wherein said coupling assembly includes a pivot axis about which said lid is pivotal with respect to said body, and wherein said coupling assembly is configured to move said pivot axis with respect to said body as said lid is opened and closed.

8. The saddlebag of claim 7, wherein said pivot axis is moved closer to said hinge assembly as said lid is moved toward said open position, such that the motion of said lid with respect to said body transitions from substantially translational motion to substantially rotational motion.

9. A motorcycle saddlebag comprising:

a lid;

a body;

a hinge assembly coupling said lid and body to facilitate moving said lid between an open position and a closed position with respect to said body;

a locking assembly selectively locking said lid in said closed position, said locking assembly including a latch mounted to said lid, a push button slidably mounted to said body, and a hook pivotally mounted to said push button by a pin, wherein depressing said push button causes said hook to pivot about said pin; and a cam mechanism rotatably coupled to said body, wherein said cam mechanism engages said latch when said lid is in said closed position, wherein depression of said push button causes said hook to engage said cam mechanism and wherein engagement of said cam mechanism by said hook causes said cam mechanism to rotate thereby disengaging said latch and allowing said lid to be moved toward said opened position.

10. A method for operating a motorcycle saddlebag having a lid and a body, the method comprising:

mounting a push button latching mechanism to one of the lid and body;

biasing the lid toward a fully open position with a biasing member;

interconnecting the lid to the body with the latching mechanism when the lid is closed;

resisting the biasing force of the biasing member with the latching mechanism;

releasing the latching mechanism in response to actuation of the push button; and opening the lid under the influence of the basing member after the latching mechanism is released, wherein opening the lid includes moving the lid in a substantially vertical translational manner with respect to the body to a partially open position, and then moving the lid in a substantially rotational manner with respect to the body to the fully open position.

11. A method of opening a motorcycle saddlebag having a lid, a body, and a hinge assembly coupled between the lid and the body, the hinge assembly defining an axis about which the lid is movable with respect to the body, the axis being movable between a first position further from the body and a second position closer to the body, the method comprising:

with the axis at the first position, opening the lid to a partially open position wherein the lid moves substantially vertically with respect to the body;

while the lid is moving toward the partially open position, moving the axis from the first position toward the second position; and while the axis is moving toward the second position, opening the lid to a fully open position by pivoting the lid with respect to the body, wherein the saddlebag further includes a biasing member between the lid and the body, and wherein the method further comprises biasing the lid toward the partially and fully open positions with the biasing member, and wherein the saddlebag further includes a latching mechanism between the lid and the body, the latching mechanism operable to maintain the lid in a closed position by resisting a biasing force generated by the biasing member, and wherein the method further comprises releasing the latching mechanism to open the lid.

12. The method of claim 11, wherein the latching mechanism includes a push button, and wherein releasing the latching mechanism includes depressing the push button.

13. The method of claim 11, wherein the hinge assembly includes first and second mounting members and first and second coupling members interconnected to define a four bar linkage, and wherein moving the axis from the first position to the second position results from the movement of the first and second mounting members and first and second coupling members.

* * * * *